(12) United States Patent
Braddock, III

(10) Patent No.: US 10,400,919 B2
(45) Date of Patent: Sep. 3, 2019

(54) SQUARE TUBE FORMING PROCESS

(71) Applicant: Henry Alexander Braddock, III, Sawyer, MI (US)

(72) Inventor: Henry Alexander Braddock, III, Sawyer, MI (US)

(*) Notice: Subject to any disclaimer, the term of this patent is extended or adjusted under 35 U.S.C. 154(b) by 250 days.

(21) Appl. No.: 15/437,877

(22) Filed: Feb. 21, 2017

(65) Prior Publication Data

US 2018/0238474 A1 Aug. 23, 2018

(51) Int. Cl.
| | | |
|---|---|---|
| *F16L 9/00* | (2006.01) | |
| *B21D 17/00* | (2006.01) | |
| *B21H 7/18* | (2006.01) | |
| *B21D 17/04* | (2006.01) | |
| *F16L 9/17* | (2006.01) | |

(52) U.S. Cl.
CPC .............. *F16L 9/003* (2013.01); *B21D 17/00* (2013.01); *B21H 7/187* (2013.01); *B21D 17/04* (2013.01); *F16L 9/006* (2013.01); *F16L 9/17* (2013.01)

(58) Field of Classification Search
CPC .. F16L 9/003; F16L 9/006; F16L 9/17; B21D 17/00; B21D 17/04; B21H 7/187
USPC ................... 138/121, 38, 177, 178, DIG. 11
See application file for complete search history.

(56) References Cited

U.S. PATENT DOCUMENTS

| | | | | |
|---|---|---|---|---|
| 343,025 | A * | 6/1886 | Gordon ................... | E01F 5/005 285/399 |
| 910,192 | A * | 1/1909 | Grouvelle ............... | F28F 13/12 138/177 |
| 4,223,586 | A * | 9/1980 | Miller .................... | H01R 11/12 411/15 |
| 4,451,966 | A * | 6/1984 | Lee ......................... | F28D 7/103 138/114 |
| 4,509,806 | A * | 4/1985 | Dudouyt ................. | F16B 12/02 108/180 |
| 4,698,896 | A * | 10/1987 | Osterwald ............ | B21D 39/063 138/173 |
| 5,158,389 | A * | 10/1992 | Osterwald ............ | B21D 39/063 403/248 |
| 6,283,159 | B1 * | 9/2001 | Tada ........................ | F16L 9/18 138/111 |
| 2013/0233435 | A1 * | 9/2013 | Henthorn ............... | F16L 25/065 138/155 |
| 2015/0273548 | A1 * | 10/2015 | Tanoue .................. | B21D 17/04 72/208 |
| 2017/0058940 | A1 * | 3/2017 | Wehner .................... | F16C 3/03 |

* cited by examiner

*Primary Examiner* — James F Hook
(74) *Attorney, Agent, or Firm* — Botkin & Hall, LLP

(57) ABSTRACT

A tube and method for sizing the effective inside diameter of the tube to a smaller effective inside diameter is provided. The method uses rollers that apply focused pressure to the tube to create a crease that reduces the effective inside diameter without substantially changing the outside envelope of the tube. The crease may be either a radius or squared. Reducing the effective inside diameter of the tube creates radiused surfaces for a self-tapping screw to cut threads.

15 Claims, 6 Drawing Sheets

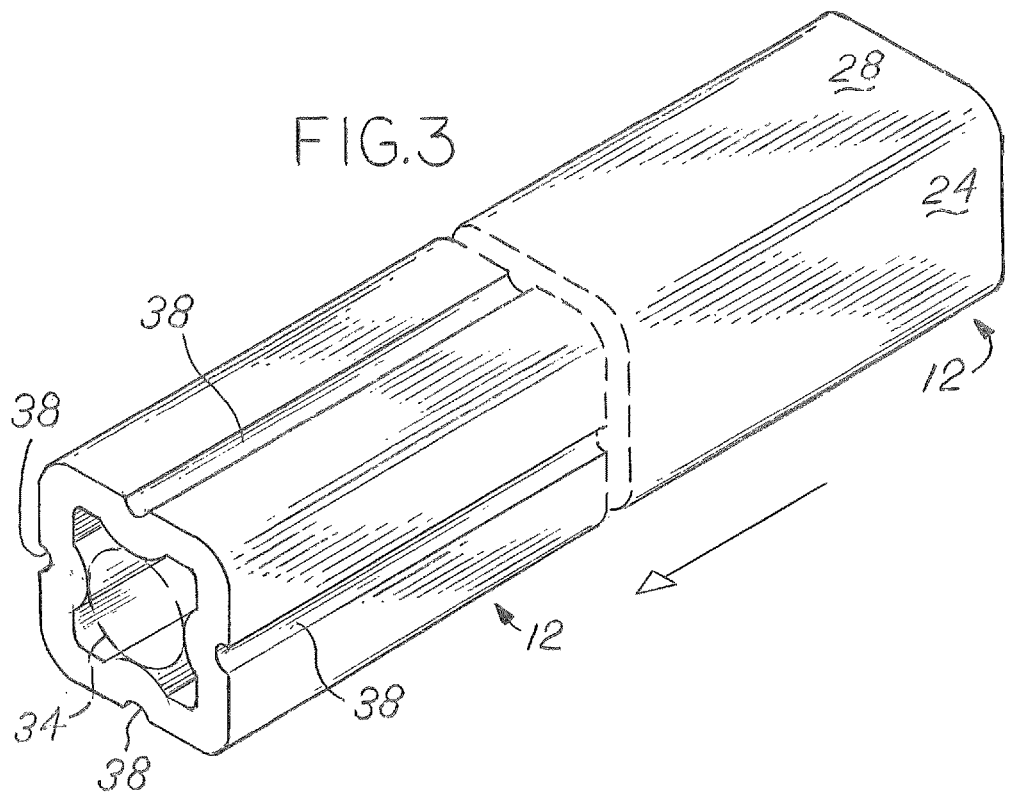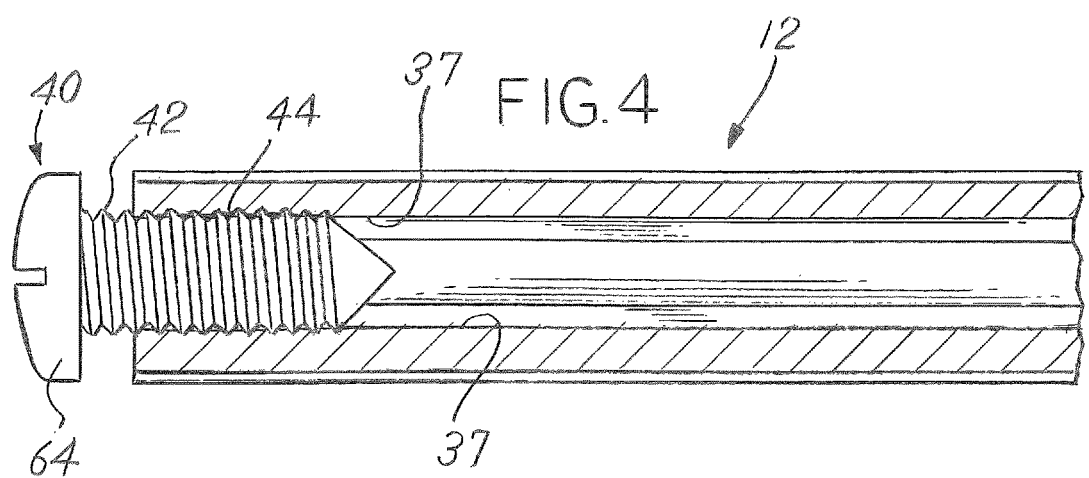

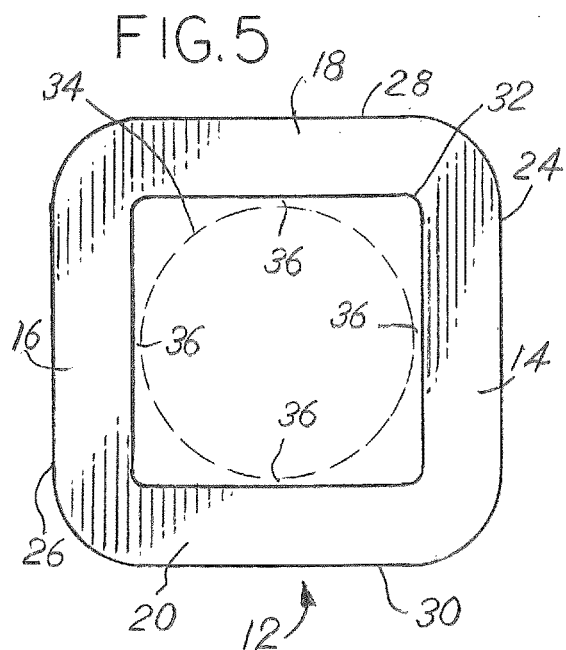
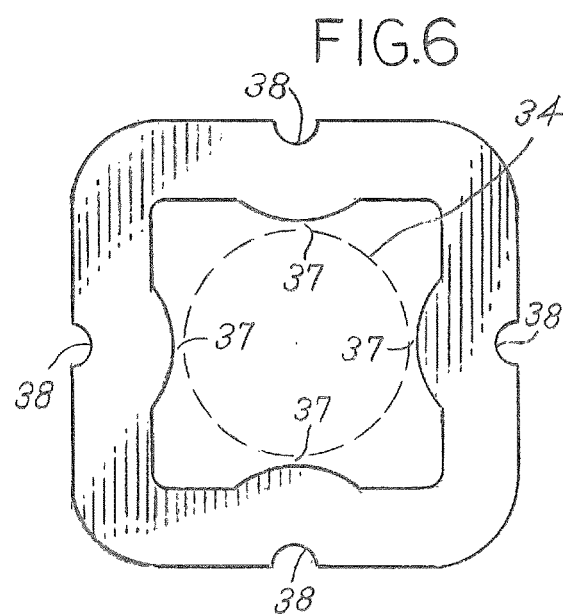
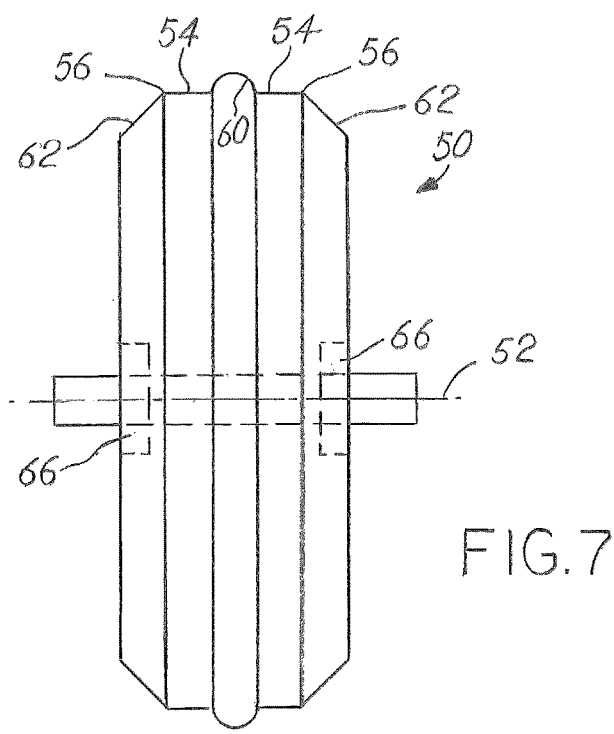

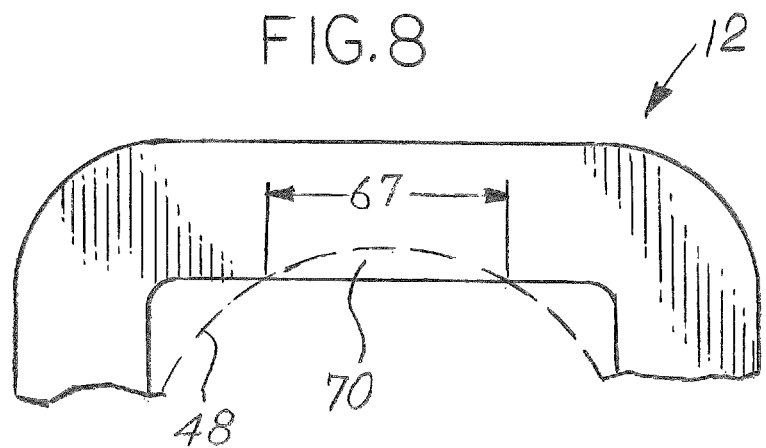
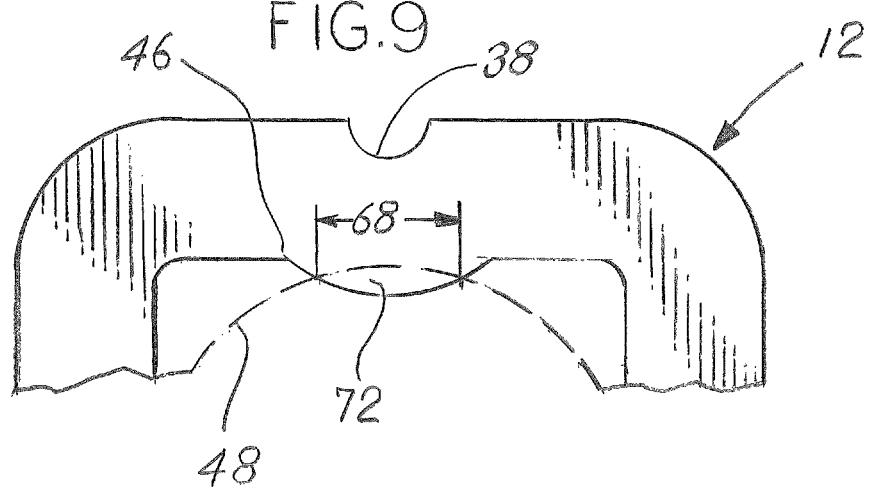

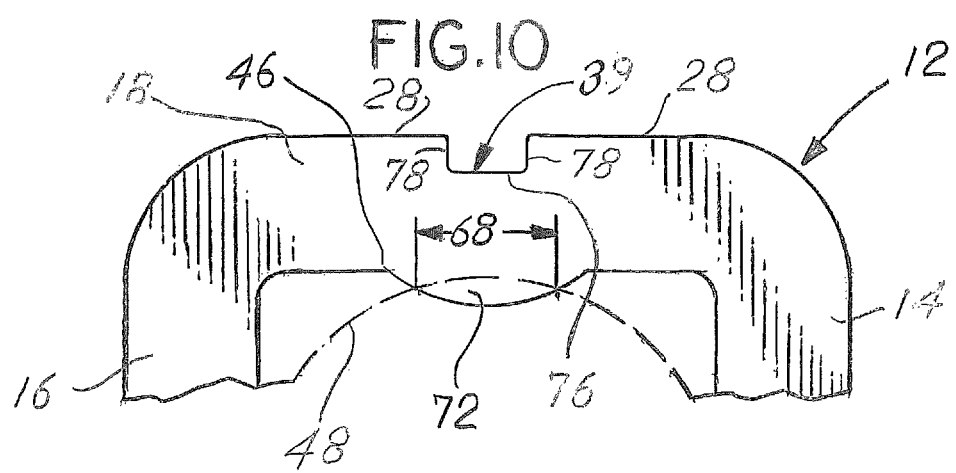

SQUARE TUBE FORMING PROCESS

BACKGROUND OF THE INVENTION

This present disclosure relates to the forming and sizing of tubing. Forming tubing to specific dimensions on the outside has been in existence for many years and is well known in the art. Tubing is typically formed from a flat sheet of metal and is passed through a series of rollers and forming equipment where the sides meet at a seam. The seam is then closed up with fusing, a resistance weld, or other robust continuous joining process. The rolling process typically creates a well-controlled outside size, but the inside commonly varies. The inside variation is from a multitude of sources, such as the welding/joining process, thickness variation, and width of the sheet that enters the roll forming equipment. It is frequently desired to have both the inside and outside controlled, such as an application where one sized tube has to slide inside of another tube or a self-tapping screw must securely mate with the inside of the tube. In this case, a post-process is required to either clean up the seam area by a flash removal process. This post-process adds cost and time. Another option sizes the relevant areas of the tubing with an additional processing step. These processes are expensive and the inside size control is coarse at best. Most importantly, it is difficult to get adequate thread penetration with a self-tapping fastener on an inside flat surface due to the wide contact area and lack of focused pressure to penetrate threads into the flat surface. An improved process is needed.

SUMMARY OF THE INVENTION

The present disclosure describes a tube forming process where tube walls are creased as the tubing passes through the process. Creases or formed inwardly portions may be added to the middle of all sides of the tube at the exact same time without adversely impacting the overall outside shape of the tube. Rollers that surround the tube form all creases at the same time, thereby eliminating bulging, twisting, or other unwanted deformation. The crease or forming depth is controllable individually on each side wall to tightly control the internal size of the tube. The process is scalable to allow for tubing with different numbers of side walls. By forming the creases in the tube, a protruding radiused surface extends inwardly into the inside section of the tube. The radiused surface provides a small area for a self-tapping screw that can be inserted to cut threads without deforming the outside of the tube. Because the radiused area is smaller than the non-formed flat surface, the threads in the screw can penetrate sufficiently to cut robust threads.

BRIEF DESCRIPTION OF THE DRAWINGS

A preferred embodiment of this invention has been chosen wherein:

FIG. 3 is an isometric view of the tubing before and after sizing, the break indicating the transition therebetween;
FIG. 4 is a section view of the tubing after sizing and receiving a self-tapping screw;
FIG. 5 is an end view of the tubing before sizing;
FIG. 6 is an end view of the tubing after sizing;
FIG. 7 is an example of a roller used to size the tubing;
FIG. 8 is a partial view 8 of the tubing in FIG. 5;
FIG. 9 is a partial view 9 of the tubing in FIG. 6;
and
FIG. 10 is a partial view of the tubing with an alternate crease shape.

DESCRIPTION OF THE PREFERRED EMBODIMENT

Figure 1:
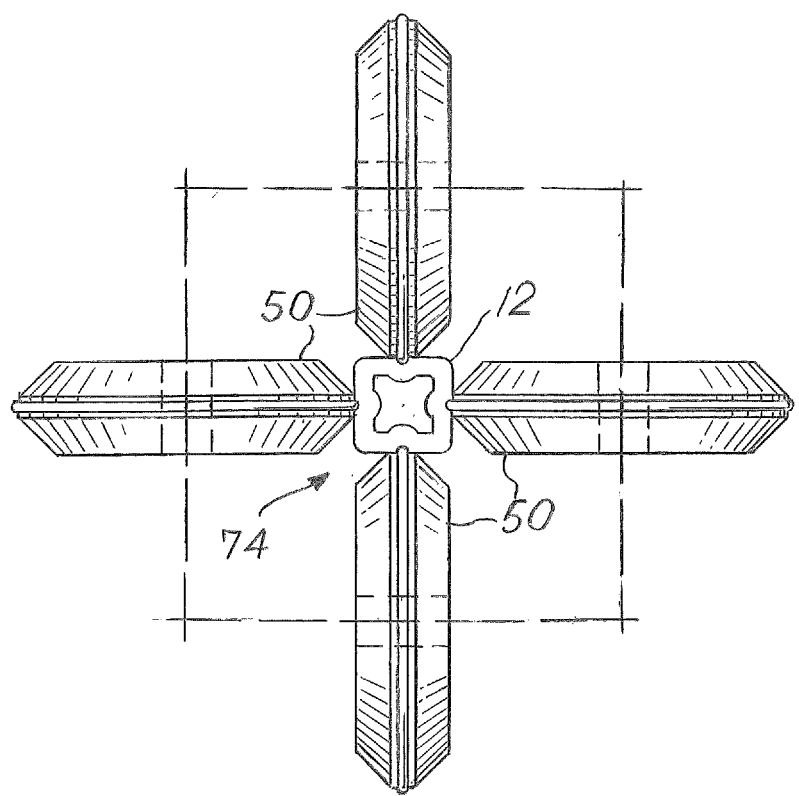
FIG. 1 is an end view of the tubing during sizing.
Figure 2:
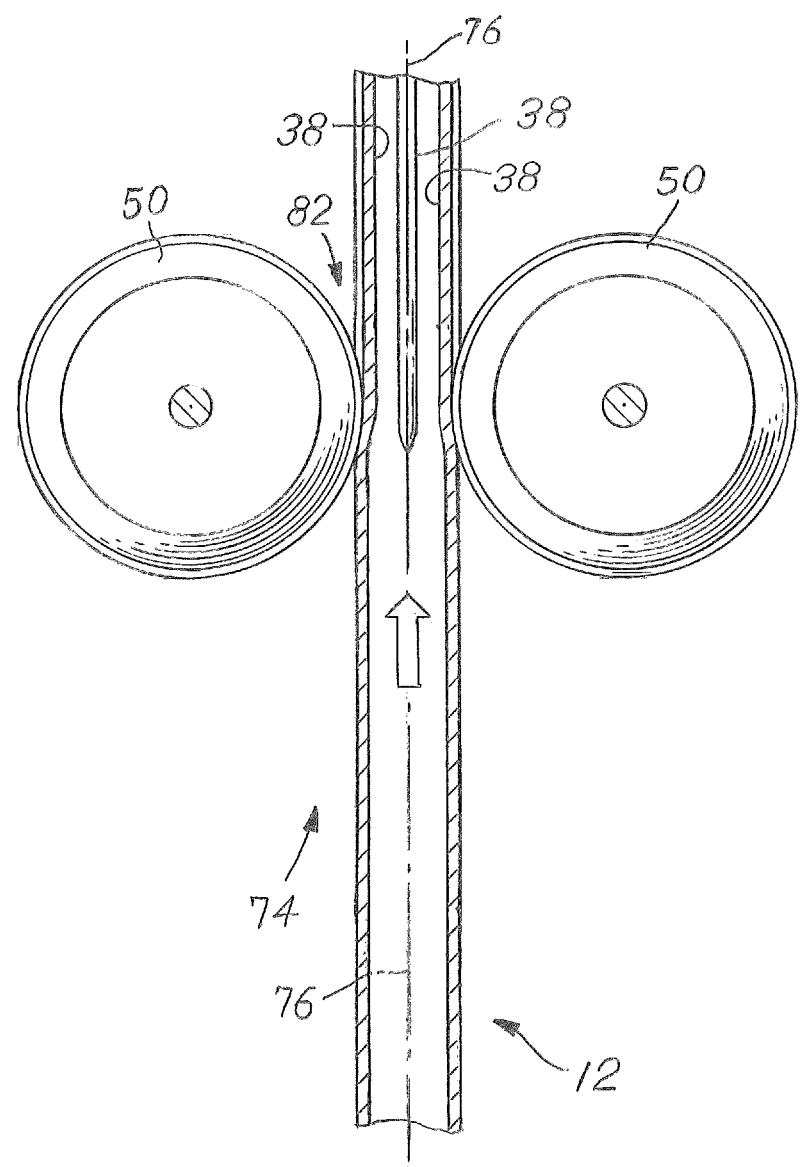
FIG. 2 is a side section view 2-2 of the tubing during sizing as shown in FIG. 1.

A tubing sizing method is shown in FIGS. 1 and 2 and is made to receive a tube 12 and resize an effective inside diameter 34 without changing the outside envelope of the tube 12. Before and after sizing of the tube 12 is shown in FIG. 3. Creases 38 are added along the outside of the tube to size the inside of the tube. For clarity, the tube 12 proceeds through the process 10 in the direction of the arrow shown in FIG. 2, although the reverse direction is contemplated.

The tube 12 as shown in FIG. 3 is commonly formed from a flat strip of sheet metal that is formed and seamed into a square shape. Forming a tube from a flat strip of metal is well known in the art. The tube 12 has side walls 14, 16, 18, 20 for the square tube as shown in FIG. 5. The side walls 14, 16, 18, 20 have corresponding outer surfaces 24, 26, 28, 30 to define an outside envelope and an inside area 32. For the purposes of clarity, the outside envelope is defined by an area determined by straight or smoothed lines drawn between radiused corners of the tube 12 to form a simplified geometric enclosed shape, such as a triangle, square, hexagon, or other polygon shape. Due to the physical limitations of formed tubing, the simplified enclosed shape frequently has radiused corners where the side walls meet but has flat inside surfaces. The flat surfaces on the inside area 32 forms an effective inside diameter 34 that is defined by the largest imaginary circle that can fit inside the inside area 32. This is typically measured by the maximum sized pin gauge that will fit inside the tube 12. Pin gauges and the measuring of effective inside diameters are well-known in the art. As shown, the effective inside diameter 34 touches the inner surfaces of the side walls 14, 16, 18, 20 at tangent points 36. After passing through the process 10, the effective inside diameter 34 is reduced due to creases 38 that are added to each of the side walls 14, 16, 18, 20. The creases 38 are shown as radiuses in FIGS. 3, 6, and 9, but the creases 39 may be squared as shown in FIG. 10. It is contemplated that other shapes of the creases 39 are used. The squared crease 39 in FIG. 10 has a bottom surface 76 that is parallel to the planar outer surface 28. The squared crease 39 has side walls 78 that extend between the planar outer surface 28 and bottom surface 76. The side walls 78 are shown perpendicular to the bottom surface 76 but it is common that the side walls 78 are tapered to make the crease 39 narrowest at the bottom surface 76 and widest at the planar outer surface 28. The crease 39 is shown in detail on the side wall 18; the other sidewalls 14, 16, 20 would have equivalent creases 38, 39. After sizing, the contact points 37 are closer to each other and each have a crowned surface 46.

The purpose of adding the creases 38, 39 and reducing the effective inside diameter 34 is to allow a self-tapping screw 40 to be inserted and tap complimentary threads. The self-tapping screw 40 has a head 64 and threads 42 to make biased contact with the crowned surface 46 at the contact points 37 and cut threads 44. Because the surface is crowned, the self-tapping screw 40 contacts a smaller sectional area 72, making it easier for the threads 42 to penetrate the surface without distorting the outside envelope of the tube 12, stripping out the threads 42, or shearing the screw 40. The screw 40 has a cutting diameter 48 shown in FIGS. 8-10 that represents the portion of the threads 42 that interfere and cut into the tube 12. This is shown by the contrast of the interference sectional area 70 in FIG. 8 to the interference sectional area 72 in FIG. 9. Sectional area 72 shows an equivalent depth as sectional area 70, but the width is much less. By having a crowned surface 46, the width of engagement 68 is smaller on the formed tube in FIG. 9 than the width of engagement 67 of the unformed tube in FIG. 8. By focusing the interference of the cutting diameter 48 and the crowned surface 46, cut threads 44 can penetrate without generating excessive torque that would be generated with the width of engagement 67 in the unformed tube. This is shown in FIGS. 9 and 10.

One way to create the creases 38 is to simultaneously pass the tube 12 between rollers 50, as shown in FIGS. 1 and 2. One example of a roller 50 is shown in FIG. 7. The roller 50 has a major diameter 54 that is interrupted in the middle with a ridge 60. The profile of the ridge 60 closely matches the crease 38 on the tube 12 after passing through the rollers 50. The rollers 50 may have a squared ridge (not shown) to create the complimentary crease 39 as shown in FIG. 10. The rollers 50 may also include chamfered surfaces 62 to allow adjacent rollers 50 to be located in close proximity. As is common, the rollers 50 are supported by bearings 66 and rotate on an axis 52. The rollers 50 may be externally driven through chains, gears, belts or other drive mechanism that will move the tube 12 through the process without the need for an external force that pushes or pulls the tube through the process.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A method of forming a length of tube to threadably receive a self-tapping screw in ends of said tube, said method comprising:
   providing said length of said tube, said tube having a number of side walls joined at corners, said side walls having a planar outside surface and a planar oppositely located inside surface, said tube having an outside envelope defined by said planar outside surfaces, said inside surfaces defining a first effective inside diameter;
   passing said tube between a number of rollers corresponding with said number of side walls, said rollers having a major diameter and a ridge extending radially outwardly therefrom;
   each said ridge continuously creasing said tube along said length, from one of said ends to another of said ends, each of said outside surfaces of said planar side walls interrupted by said creasing at a midpoint between said corners to generate creases;
   displacing a portion of said sidewall without reducing said outside envelope to create a crowned surface protruding inwardly on each said inside surface, said crowned surfaces defining a second effective inside diameter, said second effective inside diameter being smaller than said first effective inside diameter; and
   providing said self-tapping screw having a major diameter and a minor diameter, said major diameter penetrating each said crowned surface to cut threads into each said crowned surface.

2. The method of claim 1, passing said length of said tube between opposing rollers contacting corresponding opposing said sidewalls, said rollers simultaneously creasing said corresponding side walls.

3. The method of claim 1, rotating said number of rollers to move said length of tube between said number of said rollers.

4. The method of claim 1, wherein said crease is a radius.

5. The method of claim 1, wherein said crease is squared.

6. A tube comprising:
   a plurality of parallel side walls joined at corners to form an enclosed elongate member, said side walls having a planar outside surface and a planar oppositely located inside surface, said tube having an outside envelope defined by said planar outside surfaces, said inside surfaces defining a first effective inside diameter; and
   each of said outside surfaces of said planar side walls having a single crease at a midpoint between said corners, said single crease extending along an entire length of said elongate member, said crease having a bottom surface, offset from a corresponding said planar outside surface of a corresponding sidewall, said bottom surface being substantially parallel to said planar outside surface, said bottom surface terminating at corners, opposing side surfaces extending outwardly from said corners and joined to said planar outside surface, a corresponding inside surface on said sidewall, said inside surface including said crowned surface opposite said crease, said crowned surface extending inwardly of said corresponding inside surface, each said creases displacing a portion of said sidewall to create a crowned surface on each said inside surface, said crowned surfaces defining a second effective inside diameter, said second effective inside diameter being smaller than said first effective inside diameter.

7. The tube of claim 6, wherein said side surfaces of said creases being substantially perpendicular to said bottom surface and said corresponding planar outside surface.

8. The tube of claim 6, further comprising a self-tapping screw having a major diameter and a minor diameter, said major diameter penetrating each said crowned surface when said screw is threaded into said tube.

9. The tube of claim 6, wherein said crease is squared.

10. The tube of claim 6, further comprising a self-tapping fastener received by said tube, said self-tapping fastener cutting complimentary threads into said crowned surfaces.

11. A tube having a length defined by a distance between ends, said tube comprising:
   a number of side walls joined at corners, said side walls having a planar outside surface and a planar oppositely located inside surface, said tube having an outside envelope defined by a polygon having a number of sides equal to said number of side walls, said inside surfaces defining a first effective inside diameter;
   each of said outside surfaces of said planar side walls each having a single crease at a location at a midpoint said corners and extending from one of said ends to another of said ends, each said creases displacing a portion of said sidewall to create a crowned surface on each said inside surface, said crowned surfaces defining a second effective inside diameter, said second effective inside diameter being smaller than said first effective inside diameter; and
   self-tapping fastener having a major diameter and a minor diameter, said major diameter penetrating each said crowned surface when said screw is threaded into said tube, said fastener received by said ends of said tube, said self-tapping fastener cutting complimentary threads into said crowned surfaces.

12. The tube of claim 11, wherein said crease is a radius.

13. The tube of claim 11, wherein said crease is squared.

14. The tube of claim 11, wherein said crease has a bottom surface, offset from a corresponding said planar outside surface of a corresponding sidewall, said bottom surface being substantially parallel to said planar outside surface, said bottom surface terminating at corners, opposing side surfaces extending outwardly from said corners and joined to said planar outside surface, a corresponding inside surface on said sidewall including said crease including said crowned surface opposite said crease, said crowned surface extending inwardly of said corresponding inside surface.

15. The tube of claim 14, wherein said side surfaces are substantially perpendicular to said bottom surface and said corresponding planar outside surface.

\* \* \* \* \*